77-34 37
2/3/87 03 RE 32,345

United States Patent [19]

Wood

[11] E Patent Number: Re. 32,345

[45] Reissued Date of Patent: Feb. 3, 1987

[54] PACKER VALVE ARRANGEMENT

[75] Inventor: Edward T. Wood, Kingwood, Tex.

[73] Assignee: Completion Tool Company, Houston, Tex.

[21] Appl. No.: 622,957

[22] Filed: Jun. 21, 1984

Related U.S. Patent Documents

Reissue of:

[64] Patent No.: 4,420,159
Issued: Dec. 13, 1983
Appl. No.: 407,898
Filed: Aug. 13, 1982

[51] Int. Cl.[4] ..... E02D 5/00; E21B 33/12; F16J 15/46

[52] U.S. Cl. ..... 277/34; 166/151; 166/187

[58] Field of Search ..... 277/34, 34.3, 34.6; 166/151, 187

[56] References Cited

U.S. PATENT DOCUMENTS 3,527,296 9/1970 Malone ..... 277/34
4,260,164 4/1981 Baker et al. ..... 277/34

*Primary Examiner*—Robert S. Ward

[57] ABSTRACT

A valve system for use in inflating packers mounted on mandrels is disclosed. The valve system uses one or more valves to permit, through the use of seals, the flow of fluid from the interior of a tubular mandrel to the interior of the inflatable packer when pressure applied in the mandrel exceeds at least a minimum pressure. In two embodiments, inflation of the packer beyond a given pressure is prevented. In all embodiments, the differential pressure across reciprocating seals is minimized through exposure of one or both sides, directly or indirectly, to the external pressure of the mandrel and packer.

10 Claims, 13 Drawing Figures

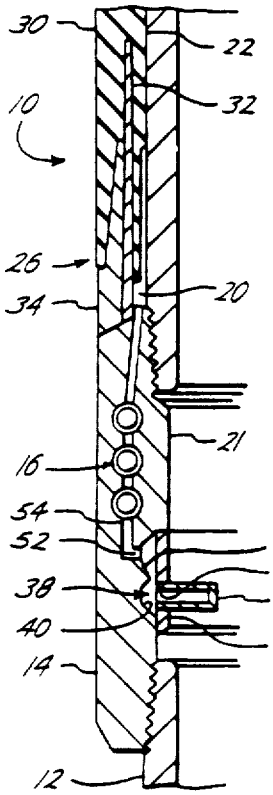
Fig. 2
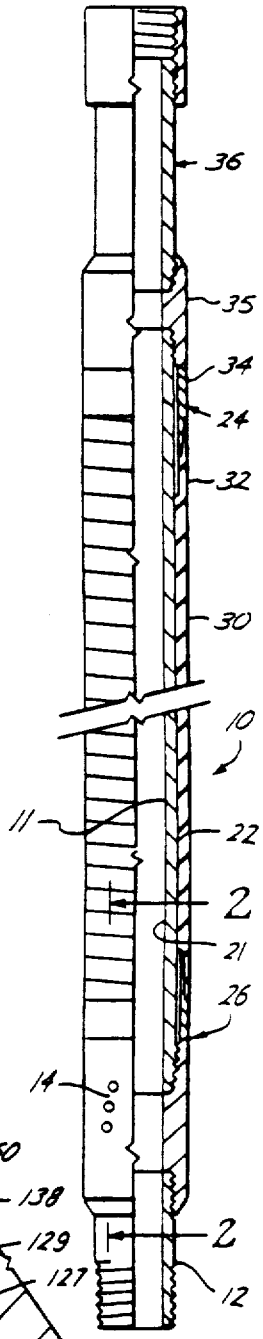
Fig. 1
Fig. 3
PRIOR ART
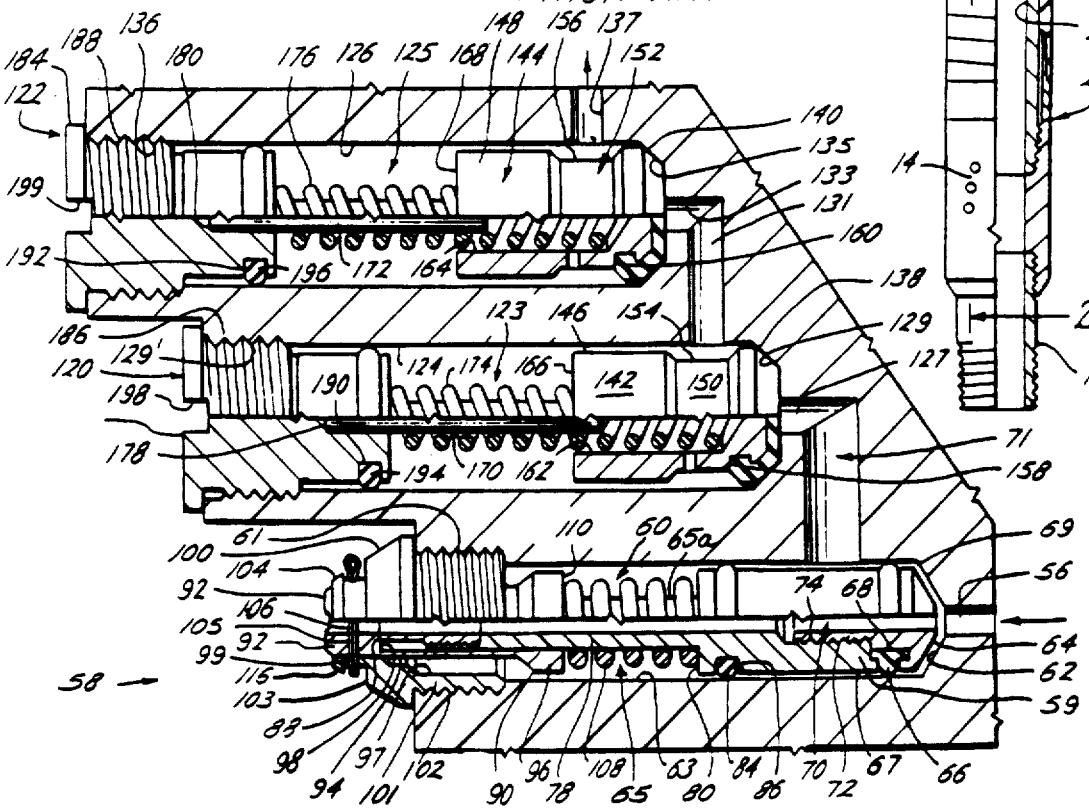

Fig. 8A
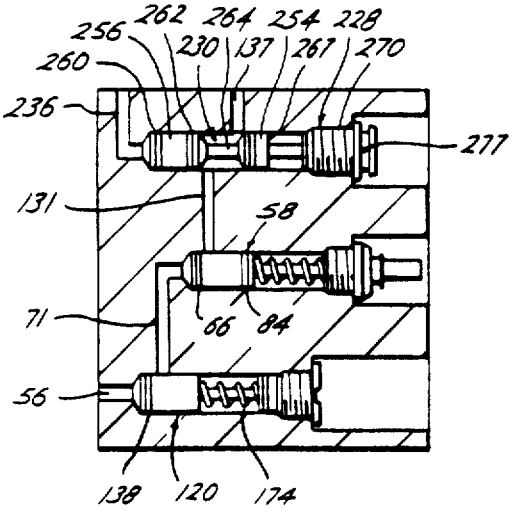
Fig. 8B
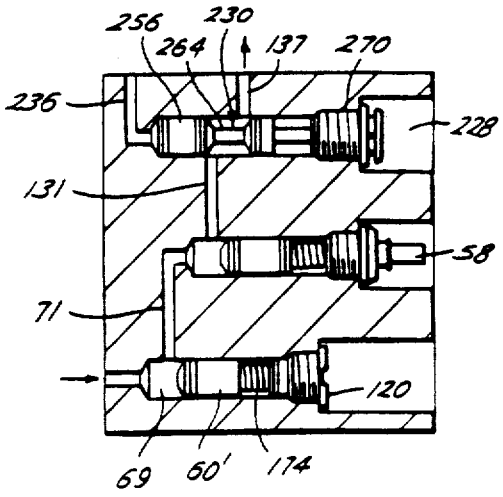
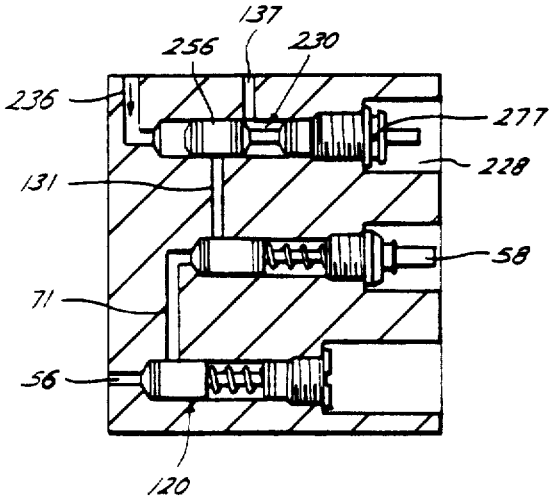
Fig. 8C

Fig. 9A
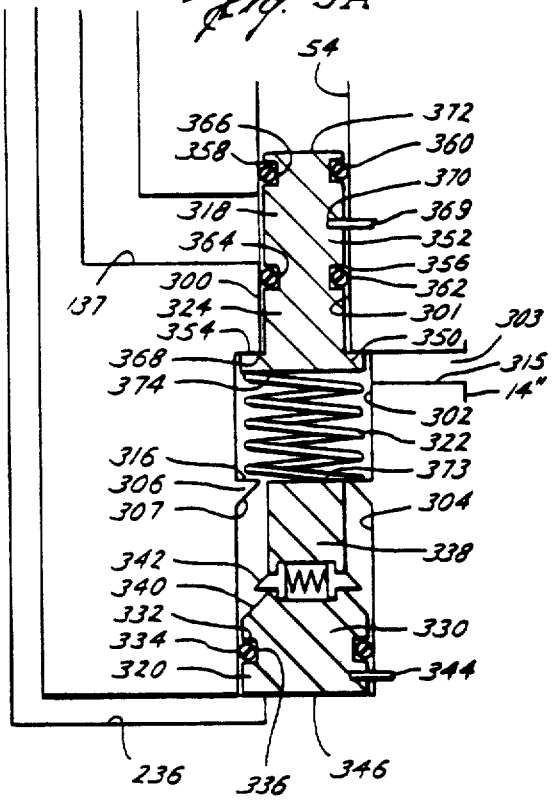
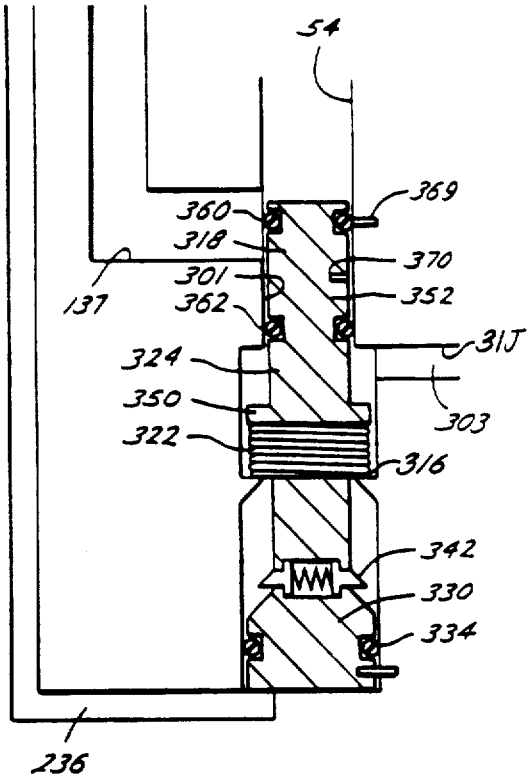
Fig. 9B
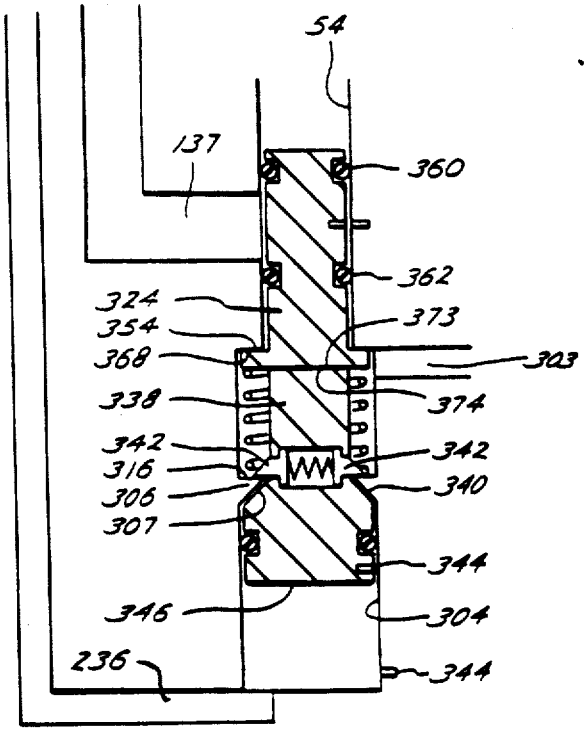
Fig. 9C

PACKER VALVE ARRANGEMENT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to packer inflation systems and more particularly to the valves which control the inflation of packers.

2. Description of the Prior Art

The control of the inflation of well packers is important to obtain integrity between the packer and the well bore for purposes of working within the bore. It is known in the art to inflate packers by various mechanisms. See, for example, U.S. Pat. No. 3,503,445, issued Mar. 31, 1970, to K. L. Cochran et al. entitled "Well Control During Drilling Operations"; U.S. Pat. No. 3,351,349, issued Nov. 7, 1967, to D. V. Chenoweth, entitled "Hydraulically Expandable Well Packer"; U.S. Pat. No. 3,373,820, issued Mar. 19, 1968, to L. H. Robinson, Jr. et al, entitled "Apparatus for Drilling with a Gaseous Drilling Fluid".

In U.S. Pat. No. 3,437,142, issued Apr. 8, 1969, to George E. Conover, entitled "Inflatable Packer for External Use on Casing and Liners and Method of Use", there is disclosed an inflatable packer for external use on tubular members such as casings, liners, and the like. A valving arrangement is disclosed therein for containing fluid within the interior of the inflatable member after it has been inflated to prevent its return to the tubular member.

Arrangements of valving have been known in the prior art to prevent further communication between the interior of the tubular member and the interior of the inflatable element after the inflatable element has been inflated and set in a well bore. See, for example, U.S. Pat. No. 3,427,651; issued Feb. 11, 1969, to W. J. Bielstein et al, entitled "Well Control"; U.S. Pat. No. 3,542,127, issued Nov. 24, 1970, to Billy C. Malone, entitled "Reinforced Inflatable Packer with Expansible Back-up Skirts for End Portions"; U.S. Pat. No. 3,581,816, issued June 1, 1971, to Billy C. Malone, entitled "Permanent Set Inflatable Element"; U.S. Pat. No. 3,818,922, issued June 25, 1974, to Billy C. Malone, entitled "Safety Valve Arrangement for Controlling Communication Between the Interior and Exterior of a Tubular Member"; and U.S. Pat. No. 3,776,308, issued Dec. 4, 1973, to Billy C. Malone, entitled "Safety Valve Arrangement for Controlling Communication Between the Interior and Exterior of a Tubular Member".

Inflatable packers have also been used in other operations, such as sealing the annular space between a jacket and a piling. See for example U.S. Pat. No. 4,063,427, issued Dec. 20, 1977, to Erwin E. Hoffman, entitled "Seal Arrangement and Flow Control Means Therefor".

The seals that are used in valves, such as in Malone, are usually hardened rubber. Such rubber tends to extrude under extreme pressure differential across the rubber and cause friction between rubber and metal that adversely affects valve operation. None of the prior art, however, provides for mechanism for equalizing pressures across the seals of the valves used to inflate packers to prevent such extrusion.

SUMMARY OF THE INVENTION

The present invention utilizes a unique arrangement of sealing mechanisms in conjunction with a valve or valves to permit the inflation of an inflatable packer element while at the same time equalizing pressure around the rubber seals of the valve or valves to prevent distortion of the seals from undue high differential pressure, and the resulting friction.

The present invention, like the prior art, is constructed and arranged so that the valve or valves remain seated to prevent communication between the interior of a tubular member and the interior of an inflatable element carried on the exterior of the tubular member until at least a predetermined pressure has been reached. This reduces the possibility of premature inflation of the inflatable element by sudden pressure changes or pressure surges which may occur within the tubular member as the tubular member is being positioned within a well bore.

However, the valve arrangement of the inflation system of the present invention includes an appropriate arrangement of the valve structure to compensate for bore pressure to prevent extrusion from undue high differential pressures across the seals of certain rubber seals which must move in the valving operation.

*In another aspect of the present invention, the valving arrangement is located at the top of an inflatable packer so that inflation of the packer can be obtained under adverse pressure conditions in the borehole.*

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 1 is a cross-section of a packer showing the three-valve collar for inflation of the packing;

FIG. 2 is an enlarged cross-section of the valve arrangement of FIG. 1 taken along section line 2—2 of FIG. 1;

FIG. 3 is an enlarged cross-sectional view of the three valves of a three-valve arrangement within the three-valve collar of the prior art;

FIGS. 8a–c are enlarged pictoral view of the sequence of steps of inflation of the packer by the three-valve arrangement of FIG. 6 and FIG. 7 shown inverted to the normal position of insertion; and FIGS. 9a–c are a pictoral view of the cross-section of a third embodiment of the valve arrangement of the present invention showing the valve and the sequence of steps for inflation of the packer shown inverted to the normal position of insertion.

DETAILED DESCRIPTION OF THE PREFERRED EMBODIMENTS

Figure 4:
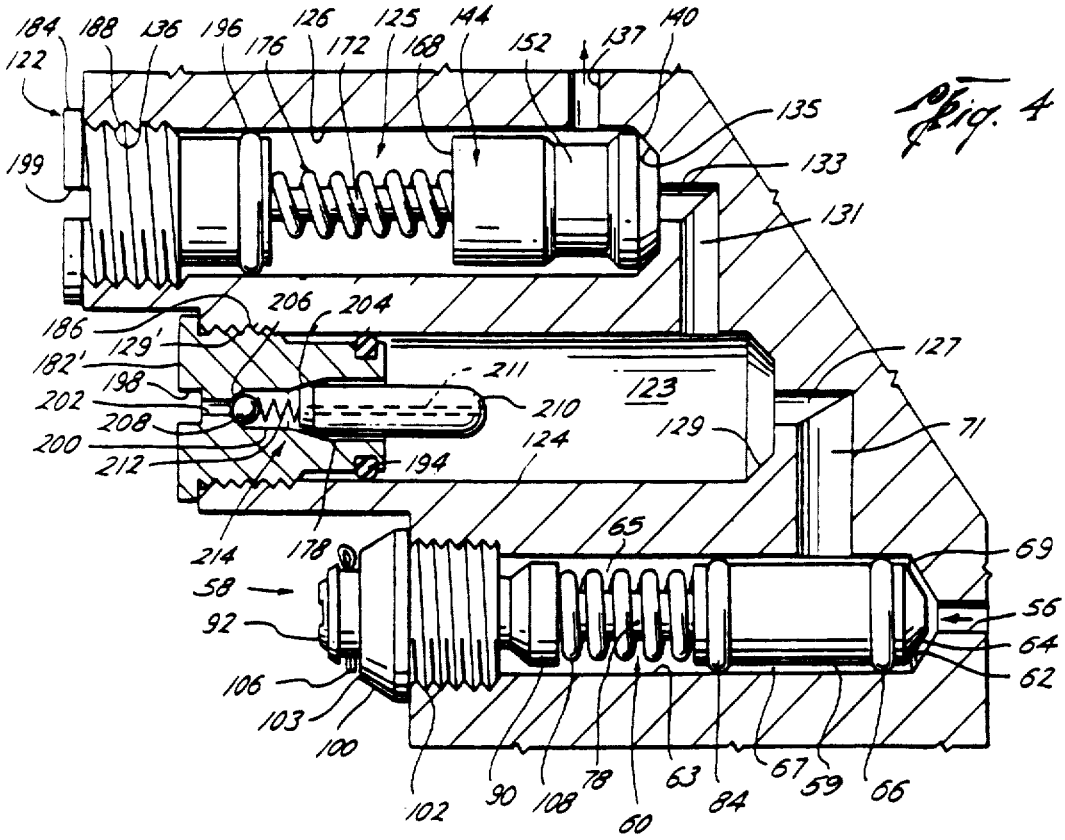
FIG. 4 is an enlarged cross-sectional view of three valves of a three-valve arrangement of the first embodiment of the present invention within the three valve collar.

A tubular [member] *inflatable packer* 10 is shown in FIGS. 1 and 2. This type of [member] *packer* could be used for any of the embodiments of the present invention and is specifically illustrated for embodiments 1 and 2. [and may be] *as* a casing packer. [Member] *The tubular inflatable packer* 10 includes a short casing joint or casing sub 12 for connection to other tubular members and is secured by suitable means, such as threads as illustrated in FIG. 1, to a valve collar 14 secured to [the body] *a tubular pipe member or mandrel* 11 [of the tubular member 10]. It should be noted that *in one aspect of the present invention*, the valve collar 14 could also be and is preferably secured to [the] *a* sub 36 [of] *at the* other end of [body] *the tubular pipe member* 11 shown in [FIG. 1] *FIGS. 6–8*. [Valve] *The valve* collar 14 includes *a* valve mechanism 16 *or system of valves and passageways* (*See* FIG. 2) for [communicating] *placing* fluid [from the interior 21 of tubular member 10 to the] *in a bore or interior 21 of the pipe member 11 in fluid communication with a* fluid channel *or chamber* 20 (*See* FIG. 2) [leading to the] *under an* inflatable[, or] packing[,] element [22] *30* carried externally on *the* tubular *pipe* member [10] *11*.

The inflatable *packing* element [22] *30* includes spaced apart *upper and lower* annular packer heads 24, 26. [Lower] *The lower packer* head 26 is secured to *the* valve collar 14[. Upper] *while the upper packer* head 24 is secured to *a* top *or upper* collar 35. [Inflatable] *The inflatable packing* element [22] *30* extends between *the packer* heads 24, 26 and is also secured to [mandrel 28] *the pipe member 11* which extends along the inside surface of *the packing* element [22] *30* between *the* valve collar 14 [to] *and the* upper collar 35 [where mandrel 28 is connected by threading or other means]. The inflatable *packing* element *30* may be of any suitable length and is [provided with] an elastomer cover [30 and two] *with upper and lower* sets of steel anti-extrusion ribs 32. [Ribs] *The ribs* 32 are connected to the *elastomer* cover [30,] such as, for example, [vulcanized into the rubber, and extend therein] *by vulcanizing the elastomer cover to the ribs 32 so that the ribs 32 extend into the ends of the elastomer cover*. Each set of ribs 32 is connected to a steel back-up sleeve 34, and one set *of ribs* is connected to *the* valve collar 14 while the other set *of ribs* is connected to *the upper* collar 35. [Sleeve] *The back-up sleeve* 34 is also connected to [packing element 22,] *the elastomer cover*, such as vulcanized with the rubber, and to *the* valve collar 14. [A] *The tubular* sub 36 is connected to the [other portion of] *upper* collar 35 for use with other tubular members *in a string of pipe or casing* (*not shown*).

[A] *As shown in FIG. 2, a* first set of *annular* grooves 38 is formed [on] *in the* valve collar 14. The set of grooves 38 includes internal, circumferential or *annular* grooves 40, 42 [formed in valve collar 14. Grooves 40, 42 are partially] *spaced longitudinally apart from one another and* covered by *a* juxtaposed screen sleeve 44. [Sleeve] *The screen sleeve* 44 includes a hole 46 [covered by] *which receives* a knock-off rod *or plug* 50, usually *constructed* of plastic, to isolate the valve system from *fluid under* pressure in the [interior] *bore* 21 of the [member 10] *pipe member 11* during running *of the inflatable packer 10 into a well bore containing fluid*.

[Groove 42 terminates in] *A* port 52 [extending] *extends* partially through the wall of the valve collar 14 and [connecting to] *connects a* passageway 54 *to the groove 42*. [Passageway] *The passageway 54 extends vertically in the wall of the* valve collar 14 [to] *between a port 56 to a valve in the valve mechanism 16 and* the port [56 of the valve system] *52* (*See FIG. 3*).

[Embodiment 1] *PRIOR ART*

[Shear] *In a prior art valve mechanism as shown in FIG. 3, a shear* valve 58 [(FIG. 3, FIG. 4)] is in fluid communication with *the* port 56 [via]. *the* [insertion of] *shear* valve 58 *being* in *a valve* pocket 60 *formed by a cylindrical bore 63 in the wall of the valve collar 14. The shear valve 58 includes a movable valve element or valve body 59 slidably disposed in the valve pocket 60.* [Pocket 60] *The valve pocket 60 is* formed in *the* valve collar 14 by drilling [of] *or* other means. [Valve] *One end of the valve* pocket 60 is in fluid communication with *the* port 56[. Pocket 60 forms] *and this end of the valve pocket 60 has an* angled valve seat 62 [at the end of pocket 60 in direct fluid communication with] *disposed around the* port 56. The [other] *open* end of *the valve* pocket 60 [is threaded with] *has* threads 61. [Pocket 60 is cylindrical in shape having upper surface 63 of one] *The movable valve element 59 has a cylindrical first surface 65a with a first* diameter [in] *forming an* upper *or first* chamber 65 *with the surface wall of the valve pocket 60* and *has a cylindrical second* [coaxial] surface 67 [of] *with* a second, [smaller] diameter [in] *forming a* lower *or second* chamber 69 *with the surface wall of the valve pocket 60*. [Upper] *The lower or second* chamber [63] *69* has an opening to *a* lateral passageway 71 [at one end] which extends further into *the* valve collar 14.

[Valve 58] *The movable valve element* [includes a cylindrical shaped] *or valve* body 59 *defining the cylindrical second surface 67 terminates* [with] *at* an end portion 64 shaped to [fit in] *compliment the valve* seat 62. A T-seal, or other suitable seal[,] 66 is [included] *disposed* [along] *on* the [circumference 73 of] *second surface 67 the valve* body 59 in *a* groove 68 [of] *near the* end portion 64. [Seal] *The seal* 66 is adapted to engage the *surface* wall [67 of] *of the valve pocket in* the lower *or first* chamber 69 [substantially parallel to the circumference 73]. [A threaded] *The movable valve element or valve body 59 has a* bore 70 [having] *with* internal threads 74 [is formed longitudinally along the lower portion of body 59. End 64 is connected by] *to connect to the end portion 64 by virtue of* external threads 72, or other suitable means[, to internal threads 74 of the longitudinal bore 70]. The *movable valve element or* valve body 59, as illustrated, is reduced in size at the end opposite to *the* end portion 64 to form a valve stem 78 with a first shoulder 80 [formed at the juncture of valve stem 78 and] *on* the valve body 59. A suitable seal 84, such as an O-ring, is arranged in *a* groove 86 on [the upper] *a* portion of *the* valve body 59 between the end portion 64 and *the first* shoulder 80. [Seal] *The seal* 84 is adapted to seal against the [upper] surface *wall* [63 of upper chamber 65 of pocket 60] and *the* groove 86 *and separate the upper or first chamber 65 from the lower or second chamber 69*.

[Valve] *The valve* stem 78 terminates at [its top] *an end* 88 which [is adjacent] *abuts an end surface 98 in a sleeve 94 in a* collet 90. [Collet] *The collet* 90 has *a* thick top section 92 and an elongated *tubular* sleeve 94 terminating in bell-shaped, lower section 96. [Sections 92 and 94 form an inner end 98 which abuts stem top 88. Collet] *The collet* 90, which abuts *the* valve stem 78 at [its inner end] *the surface* 98[,] is retained in *the valve* pocket 60 by *an* annular retainer housing 100 which annularly surrounds *the* collet 90 *and a shear pin 106 which interconnects the retainer housing 100 to the collet 90.* [Annular] *The annular* retainer housing 100 has a base 101 with threads 102 [formed on the outer circumference thereof. Threads 102] *which* mate with *the* threads 61 [which] *of the valve pocket 60 and* [secures] *secure the retainer* housing 100 to *the valve* pocket 60. [Housing] *The retainer housing* 100 further has a bore 97 formed through *its* base 101 to receive *the* collet 90 and an opening 116 [at its top] through which *the top* section 92 *of the collect 90* extends.

[A] *The* shear pin 106 extends through a bore 99 in *a* notch 103 in [the] *an* end 104 of the retainer housing 100 and a bore 105 in the end 92 of *the* collet 90 as shown in FIGS. 3 and 4 to retain *the* valve [58] *body 59* in the seated position with *its* end portion 64 adjacent *the valve* seat 62 [to] *so that the seal 66 will* block off [fluid flow through] *fluid and pressure from the* port 56 [from] *and* the [interior 18] *bore 21* of the tubular *pipe* member [10] *from access* to the *passageway 71 and hence prevent fluid or pressure from reaching the* fluid channel 20 leading to the interior of the inflatable *packing* element 30 [via passageway 71].

A spring 108 [surrounds] *is disposed on the* valve stem 78 with one end of the spring abutting the shoulder 80 and the other end *of the spring* abutting [the] *an* end 110 of the collet 90, such spring 108 being forced to a collapsed position as illustrated when the valve *body 59* is in the position as shown in [FIGS.] *FIG.* 3 [and 4] of the drawings.

The strength of shear pin 106 will determine the minimum amount of fluid [differential] pressure necessary in *the* port 56 to unseat the valve *body 59 and to open the shear valve* 58 and *to* permit fluid flow through the port 56 from the [interior of tubular] *bore 21 of pipe* member [10] *11* to the interior of [packer] *packing* element 30.

[Seals] *The seals* 66, 84 are positioned *on the valve body 59* such that when the valve [58] *body 59* is in the seated position as shown in [FIGS. 3 and 4] *FIG. 3*, the seals 66, 84 prevent any fluid flow [from] *or pressure in the* port 56 [to] *from reaching the* passageway 71. [They] *The seals 66, 84* also prevent the flow of any fluids *or pressure* from the exterior of *the valve* collar 14 *from reaching the passageway 71. Fluid in* [in contact with] the bore hole [which leak] *leaks* [through] *by the* threads 102 and past *the* collet 90 in *the* housing 100 *and* into *the* upper *or first* chamber 65 [to flow into passageway 71]. In addition, when the valve [58] *body 59* is in the seated position, *the* shoulder 80 *on the valve body 59* is separated from *a* bottom 110 *of the collet 90* by a sufficient distance [such] *so* that when the valve [58] *body 59* is no longer in the seated position [but] *then the* shoulder 80 is as close to *the* shoulder 110 as the [springs] *spring 108* will allow[,] *and the* seal 66 is positioned above *the* passageway 71 *so that fluid and pressure is admitted to the passageway 71 from the port 56.*

In FIG. 3, *the check* valves 120 and 122 are substantially identical in construction. [Valves] *The check valves* 120, 122 are located in *valve* pockets 123, 125 respectively. Each *valve* pocket 123, 125 is *formed by a cylindrical bore and is* substantially cylindrical in shape with walls 124, 126 respectively formed by drilling or other suitable means [of] *and* [opening with] *each valve pocket 123, 125 opens at* one end at the exterior outer surface of *the* valve collar 14. The other end of *the valve* pocket 123 terminates at *a* portion 127 *which places the valve pocket 123* in fluid communication with the [pocket 123 and] passageway 71. [Pocket] *The valve pocket* 123 [forms] *is formed with an* angled valve [seats] *seat* 129 at the end of *the valve* pocket 123 in direct fluid communications with *the* port 127. The other end of *the valve* pocket 123 is threaded with threads 129'. [Passageway] *A passageway* 131 also *is* formed in *the* valve collar 14 *and* extends laterally further into valve collar 14 from the wall of *the valve* pocket 123 and is in fluid communication with *the valve* pocket 123. The other end of *the valve* pocket 125 terminates at *a* port 133 *which is* in fluid communication with the *valve* pocket 125 and *the* passageway 131. [Pocket] *The valve pocket* 125 [forms] *is formed with an* angled valve [seats] *seat* 135 at the end of *the valve* pocket 125 *and is* in direct fluid [communications] *communication* with *the* port 133. The other end of *the valve* pocket 125 is threaded with threads 136. [Passageway] *A passageway* 137 *is* also formed in *the* valve collar 14 *and* extends laterally further into *the* valve collar 14 from the wall *126* of *the valve* pocket 125 and is in fluid communication with *the valve* pocket 125 and *the* fluid channel 20. (*See FIG. 2*)

Each of the [poppet] *check* valves 120, 122 includes an end portion 138, 140 respectively of elastomer *material* for engaging on seats 129, 135 respectively formed between ports 127, 133 and the walls [or] *of the valve* pockets 123, 125 respectively. Each *check* valve 120, 122 has a *movable* valve body *or element* 142, 144 respectively. The general shape of each valve body 142, 144 is cylindrical in configuration. The *valve* body 142, 144 of each valve *pocket* 123, 125 has an upper portion 146, 148 respectively and a lower, smaller diameter portion 150, 152 respectively with a swage *or annular recess* 154, 156 respectively separating the upper and lower portions of *a* valve body. The tops of elastomer [ends] *end portions* 138, 140 are fitted into grooves 158, 160 respectively formed circumferentially in lower [ends] *portions* 150, 152 respectively to hold the elastomer [ends] *end portions* on *the* lower portions 150, 152 respectively. A bore 162, 164 is formed [through the] *in an* end 166, 168 respectively of *the* [valves] *valve bodies* 142, 144 [facing] *and faces* away from *the* seats 129, 135 and extends substantially through the valve bodies 142, 144 respectively. A valve stem 170, 171 is inserted in [the] *a counter* bore 162, 164 respectively with a spring 174, 176 in its [collapsed] *expanded* position circumferentially surrounding *the valve* stems 170, 172 respectively.

Each valve stem 170, 172 is received in a bore 178, 180 respectively in *a* retainer housing 182, 184 of *the check* valves 120, 122 respectively. Each retaining housing 182, 184 is externally threaded with threads 186, 188 adapted to mate with threads 129', 136 respectively of *the valve* pockets 123, 125 respectively. Each *retaining* housing 182, 184 also includes [a slot] *an annular groove* 190, 192 sized to receive a sealing means 194, 196, such as an O-ring, to sealingly engage the walls 124, 126 of *the valve* pockets 123, 125 and [slots] *the grooves* 190, 192 respectively. Each *retaining* housing 182, 184 also includes a [groove] *slot* 198, 199 respectively cut out in [the head] *each retaining housing* for external access

*or removal of valve stems and valve bodies* from *the* valve collar 14.

In operation, when the rod *or knock-off plug* 50 is still in place, (*See FIG. 2*) any communication of fluid *or pressure* from the [interior] *bore 21* of tubular *pipe* member [10] *11* to the fluid port 56 [of any of the prior art or the embodiments] is prevented. This prevents pressure variations or pressure surges from acting through port 56 and unseating the valve *body 59 of the shear valve 58* which might prematurely inflate the *packing* element 30.

When it is desired to actuate the device [of any of the embodiments] and communicate fluid to the channel 20 of *the* packing element [22] *30* carried on the exterior of the casing or tubular member [10]*11*, any suitable means (not shown) may be dropped through member [10] *11* so as to break or shear the rod 50 to permit fluid communication with the [groove set] *set of grooves* 38.

Thereafter, fluid may be communicated through the *set of* grooves [40, 42,] *38*, the port 52, and the passage 54 to the inlet port 56 between the inner and outer walls of the valve collar 14. The fluid pressure of this fluid acts upon the end portion 64 of the valve [58]*body 59*, and the pressure within the tubular member [10] *11* may be increased so as to *produce a pressure differential between the fluid in the bore 21 of the tubular member 11 and the fluid exterior to the valve collar 14 and thereby* shear the pin 106 whereupon the valve body 59 moves to a position where *the* seal 66 no longer obstructs the flow of fluid to *the* passageway 71 from *the* port 56 thereby permitting fluid flow from *the* port 56 through passageway 71 to *the* port 127. This longitudinal movement of *the valve* body 59 causes the valve stem 78 as well as the collet 90 surrounding the end thereof to move outwardly through the opening 116 of the retainer housing 100, compressing *the* spring 108 between the shoulder 80 and the end 110 of the collet 90. The flow of fluid to *the* port 127 builds *up* pressure on *the* end 138 *of the valve body 142*. When the pressure on *the* end *portion* 138 *of the valve body 142* overcomes the break out friction of *the* end *portion* 138 and the force *required* to compress *the* spring 174, *the* valve body 142 [rises] *moves* so that *the* end *portion* 138 no longer obstructs the flow of fluid from *the* port 127 through *the* passageway 131 to *the* port 133. The flow of fluid to *the* port 133, *in turn*, builds *up* pressure on *the* end *portion* 140[,] *of the valve body 144*. [when] *When* the pressure on *the* end *portion* 140 overcomes the break out friction of *the* end *portion* 140 and the force *required* to compress *the* spring 176, *the* valve body 144 [rises] *moves* so that *the* end *portion* 140 no longer obstructs the flow of fluid from *the* port 133 to *the* passageway 137 to *the* channel 20 and [packer] *fluid supplied to the packing element* 30 inflates *the packing element 30*.

Those skilled in the art would believe that *the* shear pin 106 *in the shear valve 58* would shear at a given pressure at *the* port 56 *relative to the pressure exterior of the valve collar 14* depending only on the strength of the shear pin 106. However, this is not the case. At the time the tubular *pipe* member [10] *11* is lowered into the well, the pressure in *the* passageway 71 is at atmospheric pressure. The same is true of the pressures in *the* upper [pocket] *or first* chamber 65 and the pressure at *the* port 56. However, as the tubular *pipe* member [10] *11* is lowered into the well, the pressure in *the* upper [pocket] *or first* chamber 65 changes to [that of the exterior of] *the pressure in* the well because there is no seal [through] *to prevent well fluid from leaking by the* retainer housing 100 as discussed above. In addition, as pressure within the tubular *pipe* member [10] *11* increases, the pressure at *the* valve port 56 increases. However, there is no path for the rising *or increasing fluid* pressure to enter passageway 71 and *to* raise [it] *the pressure in passageway 71* above atmospheric *pressure*. Accordingly, while the valve *body 59* is seated, *the* seals 66, 84 will tend to extrude toward *the* passageway 71 because of the high differential pressure between the upper [pocket] *or first* chamber 65 and *the* passageway 71, and *the high differential pressure* between *the* lower [pocket] *or second* chamber 69 and *the* passageway 71. In such circumstance, the [seal] *seals* [rings] 66, 84 [are] *become* locked and the pressure *required in the port 56* to overcome *the* breakout friction to move *the valve* body 59 [then goes] *is* much higher. This is because the O-rings usually used in the prior art [of] *embodiment shown in* FIG. 3 are designed to only hold 4,000 to 5,000 psi of differential pressure. In deep wells, this breakout friction would be very high and normally a discontinuity in breakout [pressure] *friction* is exhibited at wells having a depth which exhibit downhole pressures of 5,000 to 6,000 psi. In addition, [as discussed above, the diameter] *the annulus* of *the* upper [pocket] chamber 65 is larger than *the annulus of the* lower [pocket] chamber 69. In the prior art, in order to overcome this difference in [diameter] *the annulus*, *a* sleeve is installed in *the* upper [pocket] chamber 65. Nevertheless the [sleeves] *sleeve* may not be perfect and the remaining space in the upper [pocket] chamber 65 is elliptical in shape having a major and a minor diameter both larger than the diameter of *the* lower [pocket] chamber 69. Therefore, the force of the pressure on *the* seal 84 in *the* upper [pocket] chamber 65 is greater than the force by an identical pressure acting on *the* seal 66 from *the* valve port 56.

Accordingly, as the well [is deeper and] *depth increases*, the pressure in upper [pocket] chamber 65 increases[,] *and* the amount of pressure required at *the* port 56 *to open the valve 58* may be far greater than anticipated [by knowledge of] *with respect to* the shear strength *required* of shear pin 106 in order to cause shear pin 106 to shear *at a selected pressure*.

*1ST EMBODIMENT*

To avoid the problems of the prior art [of] *embodiment illustrated in* FIG. 3, the *present invention utilizes a* valve system [is modified] as shown in FIG. 4. [The modifications include removal of shear valve 58 from pocket 60. In addition,] *In FIG. 4 as compared to FIG. 3, the check* valve 120 is [also] removed *from the valve pocket 123*. [After] *When the* shear valve 58 is removed from *the valve* pocket 60[. All] *all* grease is removed from *the* O-ring *seal* 84 and *the* T-seal ring 66. The shear valve *58* is then lubricated with Baker Tubing Seal Grease Number 499-26 which is not reactant with the O-ring seal 84 or the T-seal 66 at elevated temperatures[. The shear valve 58 is] *and* then replaced in *the valve* pocket 60 in the manner known in the prior art. [Pocket] *The valve pocket* 123 is then filled, preferably with water or other suitable substance, although it could be left unfilled. *The shear valve 58 thus has a reciprocating valve element or valve body member 59 with seals 66 and 84 which prevent flow of fluid to the passage 71 (part of the passageway means) and stop means in the form of the shear-pin 106 which prevent reciprocation of the*

*reciprocating valve member prior to the application of a predetermined pressure difference.*

[A modified] *As shown in FIG. 4, a* retainer housing 182' is [then] installed in *the valve* pocket 123. The [modified] retainer housing 182' includes a bore 200 of smaller diameter than *the* bore 178[drilled coaxially through bore 178. Housing]. *The housing* 182' [is] further [modified to include] *includes a* counter bore 202 coaxial with and of smaller diameter than *the* bore 200 *and is* formed by drilling or other means through the approximate center of *a transverse* groove 198. The disparity of diameters causes *an* downwardly, outwardly sloping shoulder 204 to be formed between *the* bore 178 and *the* bore 200 and *an* downwardly, outwardly sloping shoulder 206 to be formed between *the* bore 200 and *the* bore 202. A ball 208 is located within *the retainer* housing 182' in close proximity to the opening of *the* bore 202 facing *the* bore 200. [Ball] *The ball* 208 is held against *the* shoulder 206 by *a* compressed spring 212. [Spring] *The spring* 212 is compressed by *a* rod 210 which contains an internal longitudinal fluid passageway 211 extending therethrough and openir ; at each end. [Rod] *The rod* 210 is inserted into *the* bore 178 by hammering or other means to force the rod 210 into the entry of *the* bore 200 where it is held by friction with *the* spring 212 and *the* ball 208 extending into *the* cocurrent bore 200 such that *the* ball 208 abuts the shoulder 206 and the rod 210 extends substantially into the shoulder 204 forming a check valve assembly 214.

*The flow passage or port 56 is independent of the seals 84 and 66 for permitting flow of fluid from the interior or bore of the pipe member 11 to one side of the seal 66 and the retainer housing 100 is independent of the seals 84 and 66 for permitting the flow of fluid from the exterior of the valve collar 14 and the pipe member 11 to an oppositely facing surface of the seal 84.*

*The structure in the valve pocket 123 comprises means independent of the seals 84 and 66 for permitting the flow of fluid via passage 71 at the pressure exterior to the pipe member 11 and the valve collar 14 to the other side of each of the seals to equalize the pressure across the seals 66 and 84.*

In operation, *when the valve system of FIG. 4 is installed in* the [member 10 of the first embodiment of FIG. 4, when] *valve collar 14 and* lowered into the bore hole, [will cause] the pressure in *the* passageway 71 [to] *will* be approximately the same as the pressure in *the* upper [pocket] chamber 65 of [bore] *the valve pocket* 60. This is effected by the check valve assembly 214 *in the valve pocket 123*. As pressure from the bore hole acts on *the* tubular *pipe* member [10] *11*, and particularly on [modified] *the retainer* housing 182', fluid will flow from *the* counter bore 202 through *the* bore 200 to *the* bore 178, around *the* ball 208, through *the* passageway 211 in *the* hollow rod 210 and thence to *the valve* pocket 123, *the* port 127 and *the* passageway 71. This will permit the fluid in *the valve* pocket 123 to be maintained at the pressure approximately that surrounding the tubular *pipe* member [10] *11* which is substantially the pressure in the upper [pocket] chamber 65. Accordingly, the differential pressure between *the* upper [pocket] chamber 65 *in the valve pocket 60* and *the pressure in the* passageway 71 across *the* seal 84 will be very small. Further, the pressure at *the* port 56 will also initially be approximately that of the *well* bore so that the differential pressure across *the* seal 66 will be very small. In addition, as the pressure in port 56 [increases, and] *is increased to shear the* pin 106 [shears, causing] *and cause the valve* body 59 to move [such that], *the* seal 66 moves to a position longitudinally above passageway 71[.] *and* the pressure in *the valve* pocket 123 will increase causing *the* ball 208 to seat on the shoulder 206 thereby stopping further fluid communication between *the* bore 200 and *the* bore 202. Therefore, the pressure in passageway 71 [will] *can* continue to rise *or increase* causing *the check* valve 122 to unseat and permitting fluid flow to *the* passageway 137.

The [modified port plug] *retainer housing* 182' is usually covered with Shell Darina Grease Number 2 or other suitable lubricant to prevent plugging of the check valve 214.

In addition, because multiple packers are usually run along a tubular string comprised of tubular *pipe* members [10] *11* and other tubular members, the seal diameters should be measured and an indication of such be made, such as on the valve collar 14. In this manner the packer with the smallest upper seal 84 area will be run closest to the bottom of the hole to minimize distortion caused by different areas between *the* seals 84 and 66 since the devices of the prior art always have a larger area for *the* seal 84 than for *the* seal 66.

[Embodiment 2] *PRIOR ART*

Figure 5:
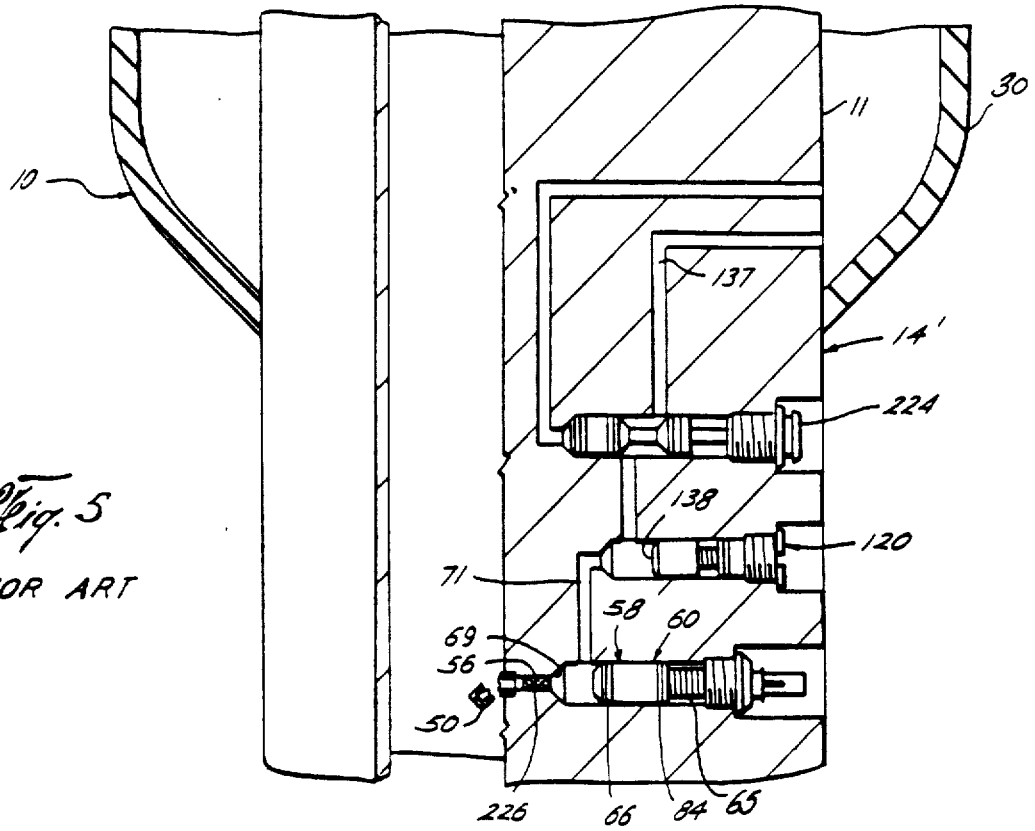
Fig. 5 PRIOR ART
FIG. 5 is a pictoral view of the cross-section of another valve arrangement of the prior art showing the valve arrangement during inflation of the packer.

Referring to FIG. 5, a different *prior art* valve configuration for use with a tubular *pipe* member [10] *11 and inflatable casing packer where the packer element 30* is shown in [the] *an* inflated and locked position. Except for the valve collar, the rest of the elements of [tubular member] *inflatable packer* 10 are substantially identical and like reference numerals will be used in reference to same. As shown in FIG. 5, *a* valve collar 14' includes three valves 58, 120, 224.

[In embodiment 2,] *In the device shown in FIG. 5*, after the rod 50 is displaced, fluid again flows through *a* passageway [54,] and optionally a screen 226, and enters *a* port 56 which is *initially* sealed by a *shear* valve 58. The problem of extrusion of *the* seals 66 and 84 when the *shear* valve *58* is initially lowered into the well is still a problem in the prior art of FIG. 5 except that a *valve* pocket [60'] *60* is used [with] *where* the diameter of *an* upper pocket chamber [65'] *65* is substantially identical to the diameter at *a* lower pocket chamber 69. The problem results from the pressure in *the* passageway 71 being substantially at atmospheric pressure when the valve collar [14] *14'* is lowered into the bore because *the* seal 138 *on the check valve 120 normally* prevents any flow to passageway 71 from the [packer channel 20] *passageway 137* and *the* seals 66, 84 prevent any leakage from chambers [65'] *65*, 69 to *the* passageway 71. Accordingly, the prior art arrangement as set out in FIG. 5 fails to prevent the extrusion of the seals 66, 84 and, accordingly, does not have a predictable shear valve pressure for the same reasons as set out in the description of *the prior art valve in* FIG. 3.

*Embodiment 2*

Figure 6:
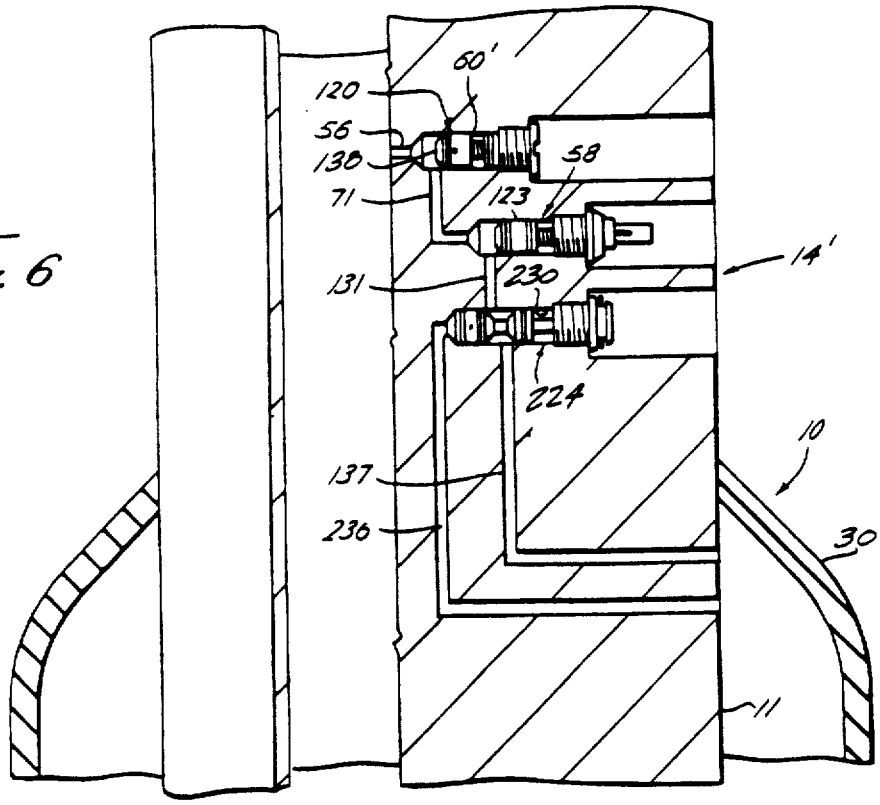
FIG. 6 is a pictoral view of the cross-section of a second embodiment of the three valves of a three-valve arrangement of the present invention within the valve collar.

As shown in FIG. 6, the present invention utilizes [the same valves 58, 120] *a shear valve 58 and a check valve 120* as the prior art of FIG. 5 *and all of the valves are located in a valve collar 14 at the upper end of a packer.* [However,] *In FIG. 6, however, the shear* valve 58 and *the check* valve 120 are interchanged [in pockets 60', 123.] *so that the shear valve 58 is in the middle valve pocket 123 and the check valve 120 is in the first valve pocket 60.* In addition, a third valve [228] *224* is used *in a valve pocket 230* which is substantially different from

*the* valve 122 *shown in FIG. 3 in the valve pocket 125* and is, preferably, identical to prior art valve 224 [supplied] *shown in FIG. 5 and is used* by Lynes, Inc. in its External Casing Packer. As seen in [FIG. 7] *FIGS. 5–7, the third* valve [228] *224* is located in *the valve* pocket 230.

Figure 7:
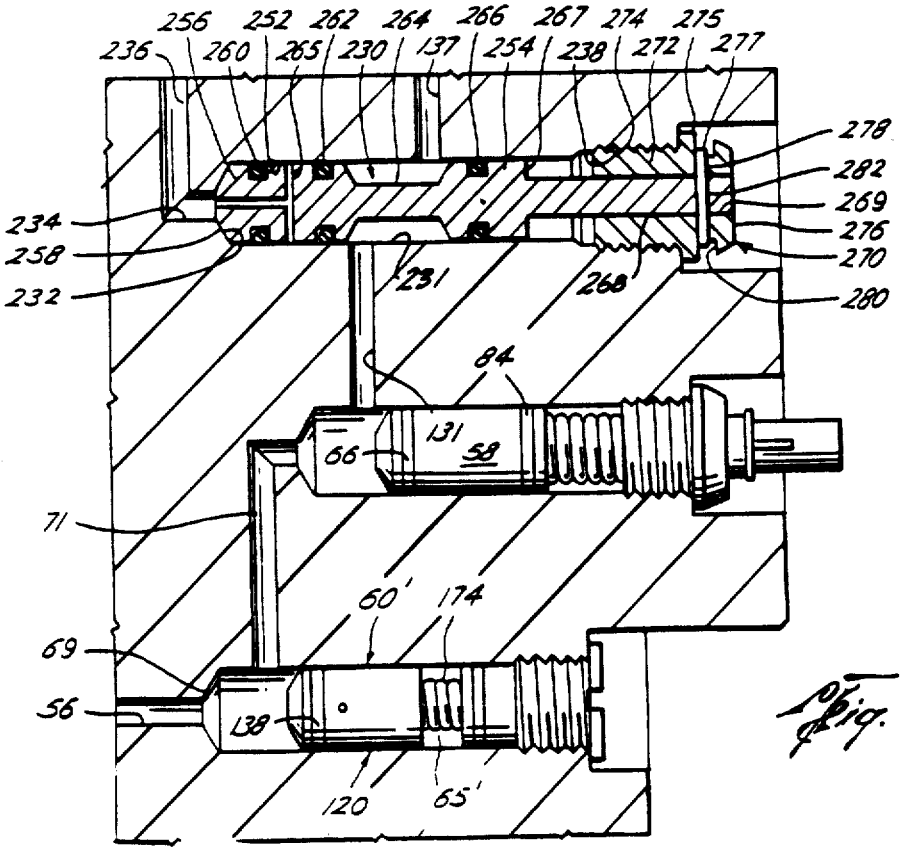
FIG. 7 is an enlarged pictoral view of a cross-section of the three valves of the three-valve arrangement of FIG. 6 shown inverted to the normal position of insertion.

[Valve 228] *The valve 224 in the valve pocket 230 and illustrated in FIG. 7, is a pressure limit valve which* includes [split] *separated* valve bodies, *i.e., an* upper valve body *or member* 254 and *a* lower valve body *or member* 256[, in] *which are disposed in the valve* pocket 230. [Pocket] *The valve pocket* 230 is substantially longer than *the valve* pocket 125 (*FIG. 3, FIG. 4*), such extension being formed by a longer bore [extension] *252 extending* into *the* valve collar 14' (the prime is used to denote a different collar 14 with substantially the same pocket and passageway configuration except as otherwise described in the description of this Embodiment 2)[, forming a substantial pocket chamber]. *The bore* 252 *extends the valve pocket 230* beyond passageway 131 and [eliminating] *thus eliminates the* port 133 (*FIG. 3*). [Valve chamber] *The bore* 252 is in fluid communication with [the rest of the valve pocket 230, including with] *the* passageways 131, 137. [Pocket chamber] *The bore* 252 [is] *has a* cylindrical [in shape with walls] *wall* 231 and [forms] *has an* angled valve seat 232 at [the] *one* end [of chamber 252] in direct fluid communication with *a* port 234 leading to a passageway 236 which is a return *passage* from the interior of [packer] *the packing element* 30. The other end of *the valve* pocket 230 is threaded with threads 238.

[Lower] *A lower* valve body 256 includes an end portion 258 shaped to [fit in] *compliment the valve* seat 232. First and second seals 260, 262 *in the valve body 256* are adapted to engage the wall 231 of the [lower chamber] *bore* 252 of *the valve* pocket 230. [End] *The end portion* 258 may be a separate piece and connected by external threads or other suitable means to internal threads of a longitudinal bore in the rest of the *lower valve* body 256. The valve body 256, as illustrated, is cylindrical in configuration and is reduced in size [at the end opposite to end portion 258 to form a short valve stem 264] *intermediate of the upper valve body 254 and the lower valve body 256*. In addition, a relief bore 265 is drilled in *the valve* body 256 between *the* seals 260, 262 and *is* in fluid communication with [chamber] *the bore* 252 there between *and* through *the* end portion 258 [and] *is* in fluid communication with *the* port 234.

[Valve] *The valve* stem 264 terminates at *the* upper body member 254. [Member] *The upper body member* 254 also has a seal 266 [disposed about member 254 and] adapted to seal against *the* wall 231. [Upper] *The upper* valve body *member* 254, as illustrated, is cylindrical in configuration and is reduced in size at the end opposite *to the valve* stem 264 to form [a] *another* valve stem 268 [forming] *and forms* a shoulder 267 therebetween. [Valve] *The valve* stem 268 extends through a bore 269 in a retainer housing 270 at the end of *the valve* pocket 230 opposite *to the valve* seat 232. This end *of the valve pocket 230* is an open portion of the external surface of *the* valve collar 14'. [Annular] *The* retainer housing 270 *is annular and* has a base 272 with threads 274 formed on the outer circumference thereof. [Threads] *The threads* 274 match with threads 238 [which secures] *and secure the retainer* housing 270 to *the valve* pocket 230. [Housing] *The retainer housing* 270 further has a wing extension 275 in *an* end 276 *of the retainer housing 270* to control the length of extension of [valve 228] *the valve body members* into *the valve* pocket 230.

A shear pin 277 extends through a bore 278 in a notch 280 in the end 276 of the retainer housing 270 and a bore 282 in the end of the *valve* stem 268 adjacent *to the* bore 269 as shown in FIG. 7 to retain *the* valve [228] *stem 268 and valve body members* in the seated position adjacent *to the* seat 232 to block off fluid flow from or to *the* port 234 and *to* permit the flow of fluid from *the* passageway 131 to *the* passageway 137. The *shear* strength of *the* shear pin 277 will determine the amount of fluid pressure necessary in *the* port 234 to unseat the valve [228] *body member 256* and block the flow through the *the* passageway 131 to passageway 137. In this regard, *the* seals 260, 262 are located on *the valve* body members 256 and *254 and are* spaced far enough apart from each other so that as *the* end 267 *of the valve body member 254* abuts the bottom of *a* base 272 *of the retainer housing 270* as pressure in port 234 urges *the* end *portion* 258 away from *the* seat 232, *the* seals 260, 262 will straddle *the* passageway 131 (FIG. 8c).

As shown in FIGS. 8a and 8b, in operation the invention of FIG. 6 *and FIG. 7* is activated initially by pressure of fluid in *the* port 56 from the [internal portion] *bore* of tubular *pipe* member [10] *11* acting on *the* end *portion* 138 of *the check* valve 120 after *the* rod 50 is removed. Only sufficient pressure is needed to overcome [the] *a* spring 174 and raise *or move the* end [120] *portion 138* above *the* passageway 71 *so that fluid can flow to the shear valve 58*. Therefore, [the] atmospheric pressure trapped in *the* passageway 71 will be relieved and no adverse effect would be had on the seals 66, 84 *or the seals 260, 262 and 266. When the pressure in passageway 71 exceeds the retaining force of the shear pin in shear valve 58, the shear valve 58 opens passageway 131.* In this regard, it should be noted that before an inflatable *packing* element 30 is permitted to be lowered into a well hole, some fluid is flushed through it to make sure no air pockets exist in the assembly to prevent failure, for example, by support rubber between the [casing 10] *tubular pipe member 11* and the [end assembly] *sleeve 34* (*see FIG. 2*) or extrusion of the rubber into the fluid channel 20 when the tubular *pipe* member [10] *11* is initially lowered into the well. Accordingly, as seen in FIG. 8a, the well pressure will act on this trapped fluid through [packer] *the packing element* 30 thereby causing [it] *the trapped fluid* to flow through *the* channel 20, *the* passageway 137, *the valve* pocket 230 and *the* passageway 131 and the pressure therethrough [to] *will* be approximately equal to the well pressure. *It is noted that the pressure in passageways 137 and 236 is equal and does not affect the valve body member 256. The pressure through fluid leakage about the valve stem 268 is also equal to the well pressure.*

[When] *Thus when* the pressure in *the* passageway 71 exceeds the pressure necessary to shear *the shear* pin [106] *in the shear valve 58* (not shown *in detail* in FIGS. 6–8), the shear pin [106] will shear and *the* seal 66 *of the shear valve 58* will rise above passageway [13] *131* as shown in FIG. 8b in the manner set out above. Fluid will then flow through *the* passageway 131, around *the valve* stem 264 of *the* valve [224] *body members 256 and 254* and thence through *the* passageway 137 into *the* channel 20 (*see FIG. 2*) for inflation of the [packer] *packing element* 30. Fluid returning to *the* passageway 236 and *the* port 234 from [packer] *the packing element* 30 will build *or increase in* pressure as the [packer 30 inflates] *packing element 30 is inflated* until the *differential* pressure between *the* port 234 and the *pressure exterior to the* valve pocket 230 exceeds the *shear* capacity of shear pin 277 *in the valve 224* (FIG. [6] *7*). As shown in FIG. 8c, when this occurs, *the* shear pin 277 will shear and *the* lower *valve* body [section] 256 will be moved into position adjacent *to the* passageway 131 with [end] *the shoulder portion* 267 abutting the bottom of *the retainer* housing 270. In that position *the* seals [60, 84] *260, 262* will straddle *the* passageway 131 preventing further flow from *the* passageway 131 to *the* passageway 137 thereby locking the [packer] *pressure in the packing element* 30 in the inflated position. In this regard, *the* bore 265 is provided for fluid communication for the [chamber] *portion of the bore* 252 [portion] between *the* seals 260 and 262 to [bore] *the port* 234 and *the* passageway 237 so that atmospheric pressure captured between these two seals 260, 262 will be vented to prevent possibility of extrusion of *the* seals 260 and 262 from *the* differential pressure either as a result of pressure in [chamber 256] *the bore 252* or in *the* passageway 236. Alternatively, the portion of the lower [chamber] *bore* 252 opposit- *to the* seal 260 when *the* seal 260 is in its lower most position may be slightly enlarged or grooved to permit fluid communication between *the* seals 260, 262 and *the* passageway 236. Such enlargement or groove would be spaced such that *the* seal 260 would rise above the enlargement or groove in its uppermost position and seal against the wall of *the* lower [chamber] *bore* 252.

It all embodiments *of FIG. 6–8*, it should be noted that the valve collar *14'* is located at the upper end of the tubular *pipe* member [10] *11* instead of the lower end. In this manner, *the* pressure *in the well bore* cannot be trapped between, for example, the well bottom and the [packer] *inflated packing element* 30 which would have an effect on the differential pressure across the valves thereby preventing the valve 224 from closing. *In other words, if the valve system of FIGS. 6–8 is located at the bottom of the packer, when the packer inflates, the pressure on the exterior of the pipe member 11 below the packer may be higher or lower than the hydrostatic pressure above the packer. With the valve 224 above the packer the hydrostatic pressure above the packer will always be less than the internal pressure in the packer element 30 and will always operate.*

Embodiment 3

Referring to FIG. 9a, there is *diagramatically* shown a third embodiment [of the] *which utilizes a single* inflation control valve in a single *valve* pocket 300. [The] *A valve* pocket 300 is bored into a valve collar 14" (the double prime is used to denote a different collar than collar 14 or 14' with substantially the same pocket and passageway configuration, *between the interior or bore of the pipe member 11, the exterior of the valve body and the channel 20 to the interior of the packing element 30,* except having one *valve* pocket and except as otherwise described in the description of this embodiment 3) or formed in a sleeve or other suitable location. [Bore] *A bore* 301, *a* first counterbore 302 and *a* second counterbore 304[, counterbores] *are the single valve pocket 300. Counterbores* 302[,] *and* 304 *are* separated by stop wings 306, *and the counterbores* are formed by drilling or other suitable operation in *the* pocket 300. [Stop] *The stop* wings 306 form an upwardly facing shoulder 316 with *the* counter bore 302 and a downwardly, outwardly facing shoulder 307 with *the* enlarged counterbore 304. Passageways 54, 303, 137 and 236 are formed in the valve collar 14" to be in communication to [interior] *bore* 21 of *the pipe* member [10] *11*, the external surface of valve collar 14" on the outside of [tubular element] *the packer* 10, the fluid channel 20 and the interior of [packer] *the packing element* 30, respectively, and to *the valve* pocket 300. [The] *A* valve element 318, which is inserted into *the valve* pocket 300, includes *a* first *valve* body member 320 having *an* upper surface 373 and *a* lower surface 346 located in *the second* counterbore 304, *a* spring 322 located in a [bore] *first counterbore* 302, and *a* second *valve* body [element] *member* 324 having upper surface 372 [and] *located in the bore 301 and a* lower surface 374 located in [bore 301 and] *the* counterbore 302 in the initial assembled position. [Passageway] *The passageway* 303 has a lower surface 315 substantially coplaner with *the* spring 322 in the initial assembled position. [First] *The first valve* body member 320 includes *an* enlarged *valve* portion 330 having *a* groove 332 formed thereabout for reception of *a* seal 334 therein. [Seal] *The seal* 334 is sized to sealingly engage the [sides] *wall* of *the* counterbore 304 and the bottom surface 336 of *the* groove 332. [Stem] *A valve stem* 338[,] *on the valve body member is* of smaller diameter than *the enlarged valve* portion 330[,] *and* extends from *the enlarged valve* portion 330 longitudinally to the end of *the* counterbore 304 approximately coplaner with [shoulders] *the shoulder* 316. The diameter of *the valve* stem 338 is substantially less than the diameter of *the valve* body portion 330 and forms *a* shoulder 340 at the interface between the *valve* steam 338 and *the valve* body portion 330. [Stop wings 342 extend from stem 338.] Stop wings 342 extend laterally from *the valve* stem 338 and are appropriately positioned along the length of *the valve* stem 338 to perform as set out below *approximately midway along the length of the valve stem 338*. The longitudinal placement of *the* stop wings 342 is determined by the [length] *dimension* of *the* shoulder 307. [Stop] *The stop* wings 342 must be sufficiently displaced from *the* shoulder 340 along the surface of *the valve stem* 338 to permit *the stop* wings 342 to extend above *the* shoulder 316 when *the* shoulder 340 meets the lower downwardly outwardly extending surface 307. A first shear pin 344, or collet, or other suitable mechanism for prevention of reciprocation, extends through the surface of *the* valve collar 14" and into the base 346 of *the valve* portion 330 *and releasably holds the valve portion 330 in its initial position.*

Spring 322 is of any suitable material having an inner diameter larger than the diameter of *the valve* stem 338 and having a collapsed length substantially equal to the distance from *the* shoulder 316 to the lower surface 315 of *the* passageway [314] *303*.

[Upper] *The upper* valve element *or member* 324 includes *a valve* base portion 350 having a diameter greater than the diameter of *the* bore 301. [Element] *The upper valve element* 324 is reduced in size along [most of] the portion extending away from [lower valve element 322] *the valve base portion 350* to form a valve stem portion 352 having a smaller diameter than *the* bore 301 with a shoulder 354 formed at the juncture of *the valve* stem *portion* 352 and *the valve* base *portion* 350. Two grooves 356, 358 are formed along the circumference of *the valve* stem *portion* 352 *and* spaced such that circumferential seals 360, 362 may be fit therein *and* sealingly [engaging] *engage* the walls of *the* bore 301 and the walls 364, 366 respectively of *the valve* stem *portion* 352. Grooves 356, 358 are spaced apart sufficiently so that *the* seals 362, 366 engage the walls on either side of *the* passage 137 when *the* shoulder 354 abuts *the* shoulder 368 formed between *the* counterbore 302 and *the* bore 301. A shear pin 369, or collet, or other suitable mechanism for prevention of reciprocation, extends through the surface of *the* valve collar 14'' and into a bore 370 formed in *the* valve stem *portion* 352 upon initial assembly *and releasably holds the valve stem portion 352 in its initial position.*

Referring to FIGS. 9a–9c, in operation the pressure from the [internal portion of tubular member 10] *bore 21 of the pipe member 11* is applied [at] *through the* passageway 54 against *the* surface 372 of *the* upper [member] *valve body element* 324. *At the same time, pressure in the borehole external to the valve collar 14'' is applied via passageway 303 to the areas defined by seals 362 and 334 in the pocket. Pressure in the borehole external to the valve collar 14'' is applied via the packing element 30 and the passageway 236 to the other side of seal 334 and is applied via the packing element 30 and to the passageway 137 to the portion of the bore 301 located between the seals 360 and 362.* When [this] *the* pressure *within tubular pipe member 11* is sufficient to overcome the *shear* strength of *the* shear pin 369, *the* shear pin 369 shears (FIG. 9b) permitting the pressure acting on *the* surface 372 to move [member] *the second valve body member* 324 longitudinally towards [lower] *second* valve [portion] *body member* 320 and *to* compress *the* spring 322. Accordingly, *the* valve seal 360 no longer prevents flow of fluid from *the* passageway 54 to *the* passageway 137, and fluid then flows to passageway 137 from passageway 54. Fluid in passageway 137 flows into *the* channel 20 and thence to the interior of [packer] *the packing element* 30 and inflates [packer] *the packing element* 30. Fluid communication with the interior of the [packer] *packing element* 30 is accomplished through *the* passageway 236 [and permits pressure to build in passageway 236. When] *equal to the pressure within the packing element 30. It will be noted that the pressure area across the seal 334 is larger than the pressure area across the seal 362 and thus when the* fluid in *the* passageway 236 has reached a predetermined pressure, greater than or equal to the pressure in *the* passageway 303, as determined by *the shear force of the* shear pin 344 [and the surface area of seal 334,] *the* shear pin 344 shears (FIG. 9c) forcing [lower] *the second valve body* member 320 to rise *or move* and the end surface 373 of 171 upper] *the second* valve *body* member 320 to abut the surface 374 of [upper] *first* valve *body* member 324. Because the surface area of *the* surface 346 is substantially greater than the surface area of *the* surface 372, the pressure in *the* passageway 236 acting on *the* surface 346 will eventually force both [lower] *the second* valve *body* member 320 and [upper] *the first* valve *body* member 324 to move through their respective [pockets] *bores* until *the* shoulder 340 *on the second valve body member 320* contacts *the* inclined surface 307. At this point, the seals 360, 362 *on the second valve body member 320* would be again spaced around *or to either side of the* passageway 137 to prevent further flow *of fluid* into the *the* passageway 137 from passageway 54 thereby retaining the inflation [of] *pressure in* the [packers] *packing element* 30. Should there [by] *be* a small loss in pressure in the passageway 236 against surface 346, the [optional] *stop* wings 342 (*which can be optional*) would prevent [lower] *the* valve *body* member 320 and [upper] *the* valve [element] *body member* 324 from moving sufficiently to again permit flow between *the* passageways 54 and 137.

Although the system described in detail above is most satisfactory and preferred, many variations in structure and method are possible. For example, wings 342 may be eliminated. Also, the members may be made of any material suitable for the environment. Further, reciprocating member or [upper] valve [element] *body member* 324 may be split horizontally so that the member has two pieces, each piece having one seal and the lower seal being of a poppet type.

The above are examples of the possible changes or variations.

Because many varying and different embodiments may be made within the scope of the inventive concept herein taught and because modifications may be made in accordance with the descriptive requirements of the law, it should be understood that the details herein are to be interpreted as illustrative and not in a limiting sense.

What is claimed as invention is:

1. In a tubular system having a [hollow] tubular mandrel;

[a packer] *an inflatable packing element* attached to the mandrel at one end;

a valve collar mounted on the other end of the mandrel, the other end of the [packer] *packing element* being attached to the *valve* collar and the *valve* collar being in fluid communication with the [packer] *packing element* by [a] passage *means* and the *valve* collar also being in fluid communication with the interior *bore* and *the* exterior of the mandrel;

a valve system mounted [on the mandrel] *in the valve collar*, the valve system being in fluid communication with the [packer] *packing element* and the interior *bore* and *the* exterior of the mandrel, the valve system including at least one valve *means* with at least one reciprocating [member] *valve element* and [a] stop means for preventing reciprocation of the reciprocating [member] *valve element* prior to the application of at least a predetermined pressure difference to the reciprocating [member] *valve element*, the reciprocating [member] *valve element* being located [at one end of] *in one position in* the [passage] *one valve means* when the stop means prevents reciprocation, the reciprocating [member] *valve element* having at least two seals thereon for preventing the flow of fluid from either side of the [reciprocating member around the member] *seals* to the passage *means*;

the improvement comprising:

first means independent of the seals for permitting the flow of fluid from the interior *bore* of the mandrel to one side of one seal [of] *on* the reciprocating [member] *valve element*; and second means independent of the seals for permitting the flow of fluid from the exterior of the mandrel to oppositely facing [surface] *side* of the other seal [of] *on* the reciprocating [member] *valve element*; and third means independent of the seals for [equalizing the pressure on the other side of each of] *permitting the flow of fluid to a location between* the seals *for equalizing the pressure across the seals* to substantially [that of] *the pressure at* the exterior of the mandrel *and to the pressure in the interior bore of the mandrel.*

[2. A tubular system for use in packing off a well bore, comprising:

a hollow tubular mandrel;

a packer attached to said mandrel at one end of said mandrel;

a valve collar mounted on the other end of said mandrel, the other end of said packer being attached to said collar and having a passageway therethrough, and said collar being in fluid communication with said packer and the interior and exterior of said mandrel by said passageway;

said passageway having enlarged portions in said collar;

a valve system mounted in said enlarged portions, said valve system including three valves;

the first of said valves being mounted in the first of said portions and having a reciprocating member and a stop means for preventing reciprocation of said reciprocating member prior to the application of at least a predetermined difference in pres ure between one side of said reciprocating member and the other side, said reciprocating member being located at one end of a first part of said passageway when said stop means prevents reciprocation and having at least two seals thereon for preventing the flow of fluid from either end of said reciprocating member around the member to said first passageway part;

said first valve being in fluid communication with a second part of said passageway in fluid communication with said interior of said mandrel on one side of said reciprocating member;

said first valve being in fluid communication with said exterior of said mandrel on the other side of said reciprocating member; and the second of said valves having check means for permitting the flow of fluid from said exterior of said mandrel to said first part of said passageway when the pressure in said mandrel exceeds the pressure in said second portion.]

[3. The system of claim 2, wherein said second portion includes a first bore opening to said exterior of said mandrel and said second valve is located in said first bore.]

[4. The system of claim 3, wherein said second valve uncludes:

a head adapted to connect to said first bore;

a seal mounted on said head and sealingly engaging the walls of said first bore and said head; and said check means is mounted in said head.]

[5. The system of claims 2, 3 or 4 wherein the remainder of said second portion is filled with a liquid.]

[6. The system of claims 1, 2, 3 or 4 wherein;

said third valve is mounted in a third of said portions, said third portion being in fluid communication with said exterior of said mandrel and a third part of said passageway in fluid communication between said second portion and said third portion and a fourth part of said passageway in fluid communication with said packer;

said third valve including first seal means for preventing fluid communication between said third portion and said exterior of said mandrel, and second seal means for preventing fluid communication between said third part and said fourth part when the pressure in said fourth part is greater than the pressure in said third part.]

7. A tubular system for use in packing off a well bore, comprising:

a [hollow] tubular mandrel;

[a packer] *an inflatable packing element* attached to said mandrel at one end of said mandrel having an interior portion separated from said mandrel *so as to receive inflating fluid* and [an] inlet *means to admit fluid* to said interior portion;

a valve collar mounted on other end of said mandrel and having [a] passageway *means* therethrough, the other end of said [packer] *packing element* being attached to said *valve* collar, and said *passageway means in said valve* collar being in fluid communication with said inlet [to said packer] *means of said packing element, with* said interior portion of said [packer] *packing element* and *with* the interior *bore* and *the* exterior of said mandrel [by said passageway];

*a valve pocket system in* said passageway *means* having enlarged portions in said *valve* collar, including

[a] first [portion] *valve pocket means* in fluid communication [with a first part of said passageway in fluid communication] with *the* interior *bore* of said mandrel,

[a] second [portion] *valve pocket means* in fluid communication with [said external part] *the exterior* of said mandrel and [a second part of said passageway in fluid communication with said first portion] *said first valve pocket means,* and

[a] third [portion] *valve pocket means* in fluid communication with [a third part of said passageway in fluid communication with said second portion, said third portion] *said second valve pocket means and* also [being in] *having separate* fluid communication [with a fourth part of said passageway in fluid communication with said interior at said packer and a fifth part of said passageway in fluid communication with said inlet to said packer] *paths to said inlet means and to the interior of said packing element;*

[a valve system mounted in said enlarged portions; said valve system including three valves;]

*valve means in said first and third valve pocket means and operable in response to pressure in said passageway means;*

[the second of said valves being mounted in said second portion and having] *valve means in said second valve pocket means for controlling the flow of fluid from the interior bore of said tubular mandrel to said inlet means including a shear valve member in said second valve pocket means, said shear valve member being* a reciprocating member *movable between a first and second position* and [a stop] *shear* means for preventing reciprocation of said reciprocating member *in said first position* prior to the application of at least a predetermined difference in pressure between one side of said reciprocating member and the other side *of said reciprocating member,* said reciprocating member being located at one end of said [second part] *second valve pocket means* when said [stop] *shear* means prevents reciprocation and having at least two seals thereon for preventing the flow of fluid from either end of said reciprocating member around said *reciprocating* member to said third [part] *pocket valve means.*

8. The system of claim 7 wherein:

said [second valve] seals *on said shear valve member* are mounted to [avoid prevention of] *permit* flow between said [second portion and said third portion through said third part when said stop means permits reciprocation] *first valve pocket means and said third valve pocket means when said reciprocating member is in said second position.*

9. The system of claims 7 or 8 wherein:

*said valve means disposed in said first valve pocket means include:*

*a reciprocating valve member movable between a first and second position and normally resiliently biased to the first position,*

[said first valve is mounted in said first portion, said first valve including]

first seal means for preventing fluid communication between said [first portion and said] *second valve pocket means and the* exterior of said mandrel, *in said first position;* and second seal means *on said resiliently biased reciprocating valve member* for preventing fluid communication between [said first part and said second part] *the interior bore of said mandrel and said second valve pocket means* when the pressure in said [second part] *first valve pocket means* is greater than the pressure in [said first part] *the interior of the mandrel.*

10. The system of claims 7 or 8 wherein:

[said third portion is in fluid communication with said exterior of said mandrel;]

said third valve [is mounted] in said third portion and *said valve means disposed in said third valve pocket means* includes a [second] reciprocating *valve* member [and a third reciprocating member connected by a stem and a second] *movable between a first and second position,* stop means *in said third valve pocket means* for preventing reciprocation of said reciprocating [members] *valve member* prior to the application of at least a predetermined pressure difference between one side of said [second] reciprocating *valve* member and the oppositely facing side of said [third] reciprocating *valve* member, said [second] reciprocating *valve* member having two seals thereon and being positioned [in said third portion] *in a spaced apart relationship* so that at least one of said seals prevents fluid flow between said [fourth part and said third portion] *third valve pocket means and said communication path to the interior of said packing element* when said stop means prevents reciprocation *in said first position;* said [third] reciprocating *valve* member [includes] *in said third valve pocket means having* third seal means *along its length* for preventing fluid communication between [a portion of said third portion and said] *said third valve pocket means and the* exterior of said mandrel; and said *first and second* seals thereon being spaced for preventing [the flow of] fluid *flow* from either [side of said second reciprocating member to said third part] *the inlet means or the interior of the packing means* after said [second] stop means [no longer prevents reciprocation,] *releases said reciprocating valve member in said third valve pocket means and said reciprocating valve member moves to said second position* said seals *and reciprocating valve member in said third valve pocket means* being positioned to permit flow from said [third part to said fifth part about said stem] *second valve pocket means to said inlet means* when said [second] reciprocating *valve* member *in said third valve pocket means* is [prevented from reciprocating by said second stop means] *in said first position.*

11. The system of claim 10 wherein there is further included [a small,] relief passage *means* between said [two] *first and second* seals of said [second] reciprocating *valve* member and one of the ends of said [second] reciprocating *valve* member.

12. [A tubular member] *An inflatable packer* for use in a bore, comprising:

*a tubular mandrel;*

[a packer] *an inflatable packing element* attached to said mandrel at one end of said mandrel *and* having an interior portion separated from said mandrel;

a valve collar mounted on the other end of said mandrel and having a passageway therethrough, the other end of said packer being attached to said *valve* collar, and said *valve* collar [being in] *having means providing a* fluid communication *path* with said interior of said [packer by a passage] *packing element* and *with* the interior *bore* and *the* exterior of said mandrel;

said [passage] *fluid communication path* having at least one [enlarged portion forming a part] *valve pocket means* in said *valve* collar;

[a valve system mounted in said enlarged portion, said valve system being] *valve element means in said valve pocket means* in fluid communication with the interior of said [packer] *packing element* and the interior *bore* and *the* exterior of said mandrel[;] *and including means responsive to a differential pressure between the pressure exterior to the valve collar and the pressure within the packing element for closing off fluid flow in said communication path to said packing element;* said valve collar being [adapted to be inserted at] *attached to* the end of said mandrel that is last to enter the bore.

[13. A tubular system for use in packing off a well bore, comprising:

a hollow tubular mandrel;

a packer attached to said mandrel at one end of said mandrel having an interior portion separated from said mandrel and an inlet to said interior portion;

a valve holder mounted on other end of said mandrel and having a passageway therethrough, the other end of said packer being attached to said valve holder, and said valve holder being in fluid communication with said inlet to said packer and the interior and exterior of said mandrel by said passageway;

said passageway having an enlarged portion in said valve holder, said portion being in fluid communication with:

a first part of said passageway in fluid communication with interior of said mandrel, said external part of said mandrel, and a second part of said passageway in fluid communication with said inlet to said packer;

a valve system mounted in said enlarged portion, said valve system including at least one valve, said valve being mounted in said portion and having a reciprocating member and a stop means for preventing reciprocation of said reciprocating member prior to the application of at least a predetermined difference in pressure between one side of said reciprocating member and the other side, said reciprocating member being located at one end of said portion when said stop means prevents reciprocation and having at least two seals thereon for preventing the flow of fluid from either end of said reciprocating member around said member to said second part;

each of said seals being exposed on one side thereof to fluid from said second part.]

*14. An inflatable well packer for use in a well bore traversing earth formations where the well packer has a tubular mandrel, an inflatable packer element on said tubular mandrel with one end of the packer element attached to the mandrel and a valve collar means attached to the other end of the packer element and mandrel.*

*the improvement comprising:*

*valve means and passage means in said valve collar means for selectively admitting fluid from the interior bore of the tubular mandrel to the interior space between said packer element and said tubular mandrel, said valve means including a first valve having spaced apart seal means on an elongated first valve element slidably received in said valve collar means for movement between first and second positions, said seal means in a first position of said valve element straddling a section of the passage means leading to said interior space between said packer element and said tubular mandrel,*

*release means for releasably retaining said first valve element in said first position and releasable upon the application of predetermined pressure differential across said seal means to move said valve element to said second position,*

*said valve element on one side of said seal means having access to the pressure exterior of the valve collar and having access on the other side of said seal means to the pressure in a portion of the passage means leading to the interior bore of said tubular mandrel so as to pressure balance said first valve element across said seal means between the interior bore of the tubular mandrel and the exterior of the valve collar means.*

*15. An inflatable well packer for use in a well bore which traverses earth formations wherein the lower end of such well packer is intended to enter the well bore first, and including*

*a tubular mandrel adapted for coupling a string of pipe,*

*an inflatable packer element disposed on said tubular mandrel and attached at its lower end to said tubular mandrel in a fluid tight relationship,*

*valve collar means attached to the upper end of said packer element and said tubular mandrel so as to have access to the pressure in the well bore above the inflatable packer element,*

*said valve collar means including at least one releasable valve means and passage means where said releasable valve means is in fluid communication with the interior bore of said tubular mandrel, the interior of the inflatable packer means and the exterior of said valve collar means above said packer element, said releasable valve means being normally retained in a first position and being releasable to a second position with respect to said passage means upon the application of a predetermined pressure differential between the fluid in the interior of the packer element and the fluid at the exterior of the valve collar means to move said releasable valve means between said first and second positions.*

*16. The well packer as defined in claim 15 where said releasable valve means includes a shear pin and movable valve element.*

* * * * *